(12) United States Patent
Eastcott et al.

(10) Patent No.: US 12,411,834 B1
(45) Date of Patent: Sep. 9, 2025

(54) VERSION CONTROL IN NETWORKED ENVIRONMENTS

(71) Applicant: Snap Inc., Santa Monica, CA (US)

(72) Inventors: William Eastcott, Los Angeles, CA (US); Zachary Paul, Santa Monica, CA (US); David Evans, Los Angeles, CA (US); Vaios Kalpias Ilias, Culver City, CA (US)

(73) Assignee: Snap Inc., Santa Monica, CA (US)

( * ) Notice: Subject to any disclaimer, the term of this patent is extended or adjusted under 35 U.S.C. 154(b) by 934 days.

(21) Appl. No.: 16/704,501

(22) Filed: Dec. 5, 2019

Related U.S. Application Data

(60) Provisional application No. 62/775,863, filed on Dec. 5, 2018.

(51) Int. Cl.
*G06F 16/23* (2019.01)
*G06F 16/22* (2019.01)

(52) U.S. Cl.
CPC ...... *G06F 16/2329* (2019.01); *G06F 16/2246* (2019.01)

(58) Field of Classification Search
CPC .. G06F 16/2329; G06F 16/2246; G06F 16/00; A63F 13/63; A63F 13/00
See application file for complete search history.

(56) References Cited

U.S. PATENT DOCUMENTS

| 666,223 A | 1/1901 | Shedlock |
| 4,581,634 A | 4/1986 | Williams |

(Continued)

FOREIGN PATENT DOCUMENTS

| CA | 2887596 A1 | 7/2015 |
| EP | 2051480 A1 | 4/2009 |

(Continued)

OTHER PUBLICATIONS

"A Whole New Story", Snap, Inc., [Online] Retrieved from the Internet: <URL: https://www.snap.com/en-US/news/>, (2017), 13 pgs.

(Continued)

*Primary Examiner* — William P Bartlett
(74) *Attorney, Agent, or Firm* — Schwegman Lundberg & Woessner, P.A.

(57) ABSTRACT

The disclosed embodiments provide a version control system within a social networking environment. The disclosed embodiments perform operations comprising: storing, in a database, application data that is structured as a tree graph comprising nodes in the form of branches connected by respective edges, each child branch being connected to a single corresponding parent branch by a respective edge; generating a first checkpoint identifying a node of the tree graph, the first checkpoint comprising first checkpoint state information corresponding to initial state information of the node of the tree graph; generating a second checkpoint identifying the node of the tree graph, the second checkpoint comprising second checkpoint state information corresponding to the initial state information of the node of the tree graph; merging changes made to the first and second checkpoint state information; and modifying the initial state information of the node of the tree graph based on the merged changes.

19 Claims, 8 Drawing Sheets

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |

(56) References Cited

U.S. PATENT DOCUMENTS

| | | |
|---|---|---|
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 10,674,311 B1 | 6/2020 | Bouba et al. |
| 10,893,385 B1 | 1/2021 | Berardino et al. |
| 10,936,066 B1 | 3/2021 | Jaureguiberry et al. |
| 10,939,246 B1 | 3/2021 | Dancie et al. |
| 10,945,098 B2 | 3/2021 | Dancie et al. |
| 11,032,670 B1 | 6/2021 | Baylin et al. |
| 11,039,270 B2 | 6/2021 | Bouba et al. |
| 11,166,123 B1 | 11/2021 | Guillaume |
| 11,275,439 B2 | 3/2022 | Jaureguiberry et al. |
| 11,294,936 B1 | 4/2022 | Jaureguiberry |
| 11,307,747 B2 | 4/2022 | Dancie et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |

(56) References Cited

U.S. PATENT DOCUMENTS

| | | |
|---|---|---|
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270331 A1* | 10/2008 | Taylor .................. G06N 3/126 706/13 |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029475 A1* | 2/2011 | Gionis .................... G06N 5/02 706/52 |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |

(56) References Cited

U.S. PATENT DOCUMENTS

| | | |
|---|---|---|
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0179393 A1* | 7/2013 | Tsai .................. G06F 16/9024 707/600 |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0305002 A1* | 11/2013 | Hallak .................. G06F 3/0683 711/E12.103 |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0040199 A1* | 2/2014 | Golab .................. G06F 16/211 707/634 |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimellah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0127618 A1* | 5/2015 | Alberti .................. G06F 16/128 707/678 |
| 2015/0154262 A1* | 6/2015 | Yang .................. G06F 16/2358 707/649 |
| 2015/0169827 A1 | 6/2015 | Laborde |
| 2015/0172534 A1 | 6/2015 | Miyakawaa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0356207 A1* | 12/2015 | Reitman .................. G06F 30/15 703/1 |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |

(56) References Cited

U.S. PATENT DOCUMENTS

| | | | |
|---|---|---|---|
| 2017/0225076 A1* | 8/2017 | Kharkar | A63F 13/56 |
| 2017/0287006 A1 | 10/2017 | Azmoodeh et al. | |
| 2018/0365336 A1* | 12/2018 | Raghavendra | H04L 41/0859 |
| 2019/0108104 A1* | 4/2019 | Gupta | G06F 16/2358 |
| 2019/0377463 A1* | 12/2019 | Fletcher | H04L 41/22 |
| 2020/0004389 A1* | 1/2020 | Pacht | G06F 3/0484 |
| 2020/0314586 A1 | 10/2020 | Bouba et al. | |
| 2020/0382912 A1 | 12/2020 | Dancie et al. | |
| 2020/0401225 A1 | 12/2020 | Jaureguiberry et al. | |
| 2021/0011612 A1 | 1/2021 | Dancie et al. | |
| 2021/0152979 A1 | 5/2021 | Berardino et al. | |
| 2021/0266704 A1 | 8/2021 | Dancie et al. | |
| 2021/0377693 A1 | 12/2021 | Bouba et al. | |
| 2021/0409904 A1 | 12/2021 | Baylin et al. | |
| 2022/0174455 A1 | 6/2022 | Guillaume | |
| 2022/0269345 A1 | 8/2022 | Jaureguiberry et al. | |

FOREIGN PATENT DOCUMENTS

| | | | |
|---|---|---|---|
| EP | 2151797 A1 | 2/2010 | |
| GB | 2399928 A | 9/2004 | |
| KR | 19990073076 A | 10/1999 | |
| KR | 20010078417 A | 8/2001 | |
| WO | WO-1996024213 A1 | 8/1996 | |
| WO | WO-1999063453 A1 | 12/1999 | |
| WO | WO-2000058882 A1 | 10/2000 | |
| WO | WO-2001029642 A1 | 4/2001 | |
| WO | WO-2001050703 A3 | 7/2001 | |
| WO | WO-2006118755 A2 | 11/2006 | |
| WO | WO-2007092668 A2 | 8/2007 | |
| WO | WO-2009043020 A2 | 4/2009 | |
| WO | WO-2011040821 A1 | 4/2011 | |
| WO | WO-2011119407 A1 | 9/2011 | |
| WO | WO-2013008238 A1 | 1/2013 | |
| WO | WO-2013045753 A1 | 4/2013 | |
| WO | WO-2014006129 A1 | 1/2014 | |
| WO | WO-2014068573 A1 | 5/2014 | |
| WO | WO-2014115136 A1 | 7/2014 | |
| WO | WO-2014194262 A2 | 12/2014 | |
| WO | WO-2015192026 A1 | 12/2015 | |
| WO | WO-2016044424 A1 | 3/2016 | |
| WO | WO-2016054562 A1 | 4/2016 | |
| WO | WO-2016065131 A1 | 4/2016 | |
| WO | WO-2016100318 A2 | 6/2016 | |
| WO | WO-2016100318 A3 | 6/2016 | |
| WO | WO-2016100342 A1 | 6/2016 | |
| WO | WO-2016149594 A1 | 9/2016 | |
| WO | WO-2016179166 A1 | 11/2016 | |

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell The Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report mailed Sep. 29, 2015", 2 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.

\* cited by examiner

```
500
```

┌─────────────────────────────────────────┐
│ STORE, IN A DATABASE, APPLICATION DATA  │ ~501
│ THAT IS STRUCTURED IN A FORM OF A TREE  │
│ COMPRISING A PLURALITY OF NODES         │
└─────────────────────────────────────────┘
                    ↓
┌─────────────────────────────────────────┐
│ GENERATE A FIRST CHECKPOINT THAT        │ ~502
│ IDENTIFIES A NODE OF THE TREE, THE FIRST│
│ CHECKPOINT COMPRISING FIRST CHECKPOINT  │
│ STATE INFORMATION CORRESPONDING TO      │
│ INITIAL STATE INFORMATION OF THE NODE OF│
│ THE TREE                                │
└─────────────────────────────────────────┘
                    ↓
┌─────────────────────────────────────────┐
│ GENERATE A SECOND CHECKPOINT THAT       │ ~503
│ IDENTIFIES THE NODE OF THE TREE, THE SECOND│
│ CHECKPOINT COMPRISING SECOND CHECKPOINT │
│ STATE INFORMATION CORRESPONDING TO THE  │
│ INITIAL STATE INFORMATION OF THE NODE OF│
│ THE TREE                                │
└─────────────────────────────────────────┘
                    ↓
┌─────────────────────────────────────────┐
│ MERGE CHANGES MADE TO THE FIRST AND     │ ~504
│ SECOND CHECKPOINT STATE INFORMATION     │
└─────────────────────────────────────────┘
                    ↓
┌─────────────────────────────────────────┐
│ MODIFY THE INITIAL STATE INFORMATION OF │ ~505
│ THE NODE OF THE TREE BASED ON THE MERGED│
│ CHANGES                                 │
└─────────────────────────────────────────┘

*FIG. 5*

VERSION CONTROL IN NETWORKED ENVIRONMENTS

CROSS-REFERENCE TO RELATED APPLICATION

The present disclosure claims the benefit of U.S. Provisional Application No. 62/775,863, filed Dec. 5, 2018, which is hereby incorporated by reference in its entirety.

TECHNICAL FIELD

The present disclosure generally relates to the technical field of social networks. In particular, the present embodiments are generally directed to providing version control in a social network.

BACKGROUND

As the popularity of social networking grows, social networks are expanding their capabilities. To improve ease of use, social networks are integrating more and more functions such that a user may accomplish many or even most of their computer-based tasks within the social network itself. One vision of social networks is that they eventually become a virtual operating system, from which a user rarely if ever finds a need to remove themselves.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 5 is a flowchart of a process that may be implemented in at least some of the disclosed embodiments.

DETAILED DESCRIPTION

Figure 1:
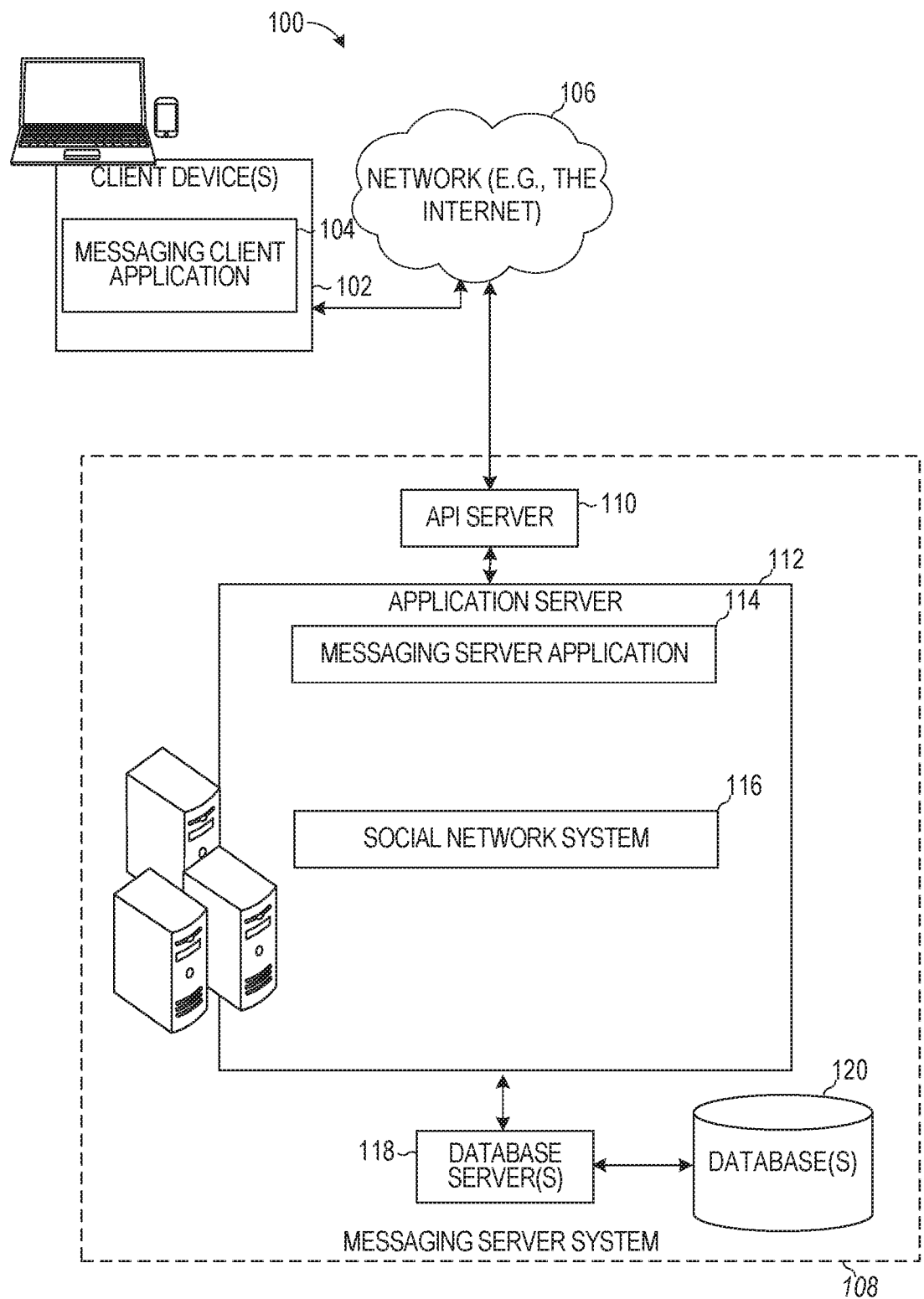
FIG. 1 is a block diagram showing an example messaging system for exchanging data (e.g., messages and associated content) over a network, according to some embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Traditional version control systems are designed for projects consisting of files which reside on a file system. Each user of the system copies the files to a local computer where changes can be made and then submitted back to a shared copy of the files. The version control system is built for cases when a project consists of items stored in a database and multiple users may access and change the data at the same time. Typically, users work on their own copies of the project, called branches, which are later merged. Typical systems enable such version control for textual files by merging the textual files on a line-by-line basis. Such systems do not guarantee the validity of the merge result (e.g., a merge may result in a program text with invalid syntax because of mismatched parentheses). Typical systems do not provide a mechanism for users to work independently and modify non-textual objects as work from two branches cannot be merged and combined. This means that users in typical systems have to work on non-textual objects sequentially, which results in projects taking a very long time to complete and wastes system resources.

The disclosed embodiments improve the overall functioning and efficiency of a computer by providing a version control system for non-textual objects. The disclosed embodiments provide a real-time collaborative system that enables multiple users to access and edit the same data set or document with no user action required to accept another user's changes or resolve conflicting changes. According to the disclosed embodiments, a database stores a current (active) state of each node of a tree graph of application data, and a storage system is provided for checkpoints, which are snapshots of the current state associated with a given node of the application data tree graph. The checkpoints themselves are arranged in a tree graph (separate from the application data tree graph) and are connected back to the node of the application data tree graph to which they correspond. Two separate tree graphs are used in the disclosed embodiments to enable real-time collaboration. The first tree graph includes the application data nodes and the second tree graph includes checkpoint nodes associated with a given one of the application data nodes of the first tree graph. The current state database acts as the source of truth for real-time collaboration. The checkpoint storage system may consist of multiple types of data stores (for example, a database and a file system).

According to some embodiments, to provide for version control in non-textual objects, application data that is structured in a form of a tree graph comprising a plurality of nodes is stored and accessed. Each node in the tree includes a set of code segments for one or more attributes of the application code. Specifically, the application data may include a scene of a gaming application, wherein each of the plurality of nodes represents a different game entity, wherein a first of the plurality of nodes represents a player character, wherein the first node is connected to a subtree of nodes representing properties of the player character, and wherein a subtree of a first of the properties of the player character comprises a collection of simpler properties of the first property. In this way, the application data defines a scene of a gaming application which is a non-textual object.

A user request may be received to modify a given node of the tree graph of the application data. In response, a first checkpoint is generated that identifies the node of the tree graph and includes first checkpoint state information corresponding to initial state information of the node of the tree graph. Another user may request to modify the same given node of the application data tree graph and, in response, a second checkpoint is generated that identifies the node of the application data tree graph and includes second checkpoint state information corresponding to the initial state information of the node of the tree graph. The first and second checkpoints are arranged in a checkpoint tree graph. The users can see the changes made to the given node of the checkpoint tree graph in real-time as the two users make changes to their respective state information. Changes made to the first and second checkpoint state information are merged by comparing the changes made to the respective checkpoint state information relative to the initial state information. Specifically, a first difference is computed for a given attribute in modified first checkpoint state information and the given attribute in the initial state information of the node and it is determined whether the given attribute has been modified in the second checkpoint state information. Then, the initial state information of the node of the application data tree graph is modified based on the merged changes by replacing the given attribute in the initial state information with the data for the given attribute in the modified first checkpoint state information in response to determining that the given attribute has not been modified in the second checkpoint state information.

In some implementations, a path in a tree graph is a sequence of nodes from the root node to the current node. If a leaf node exists in both branches, of a given node of the tree graph, being merged (e.g., its path and identifier are the same), the merging system selects the value from a leaf in one branch which differs from the value in the given node, provided the value in the leaf in the other branch has not been changed. If the values in both branches differ from the given node and from each other, the merging system presents a conflict to the user for manual resolution, and after a desired result value is selected, the leaf node with that value is inserted at the same path into the node of the tree graph for the application data. Thus, the result of any merge is guaranteed to be a valid graph (tree). In this way, non-textual data can be worked on in parallel by multiple users, which increases the efficiency of the computer and reduces the amount of processing resources needed to accomplish a task.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box (STB), or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WIMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Figure 2:
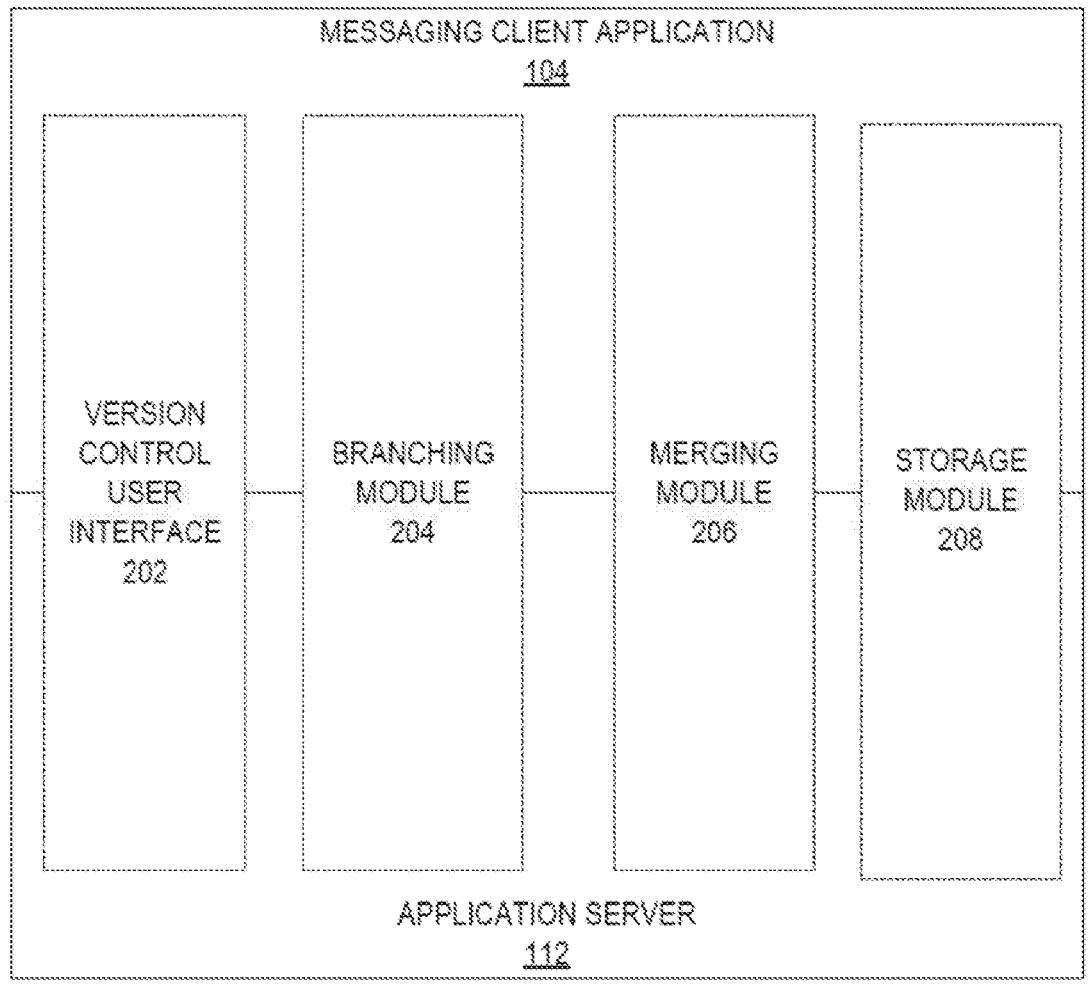
FIG. 2 is block diagram illustrating further details regarding the messaging system, according to some embodiments.

FIG. 2 is block diagram illustrating further details regarding the messaging system 100, according to exemplary embodiments, Specifically, the messaging system 100 is shown to comprise the messaging client application 104 and the application server 112, which in turn embody a number of subsystems, namely a version control user interface 202, branching module 204, merging module 206, and a storage module 208.

Figure 4A:
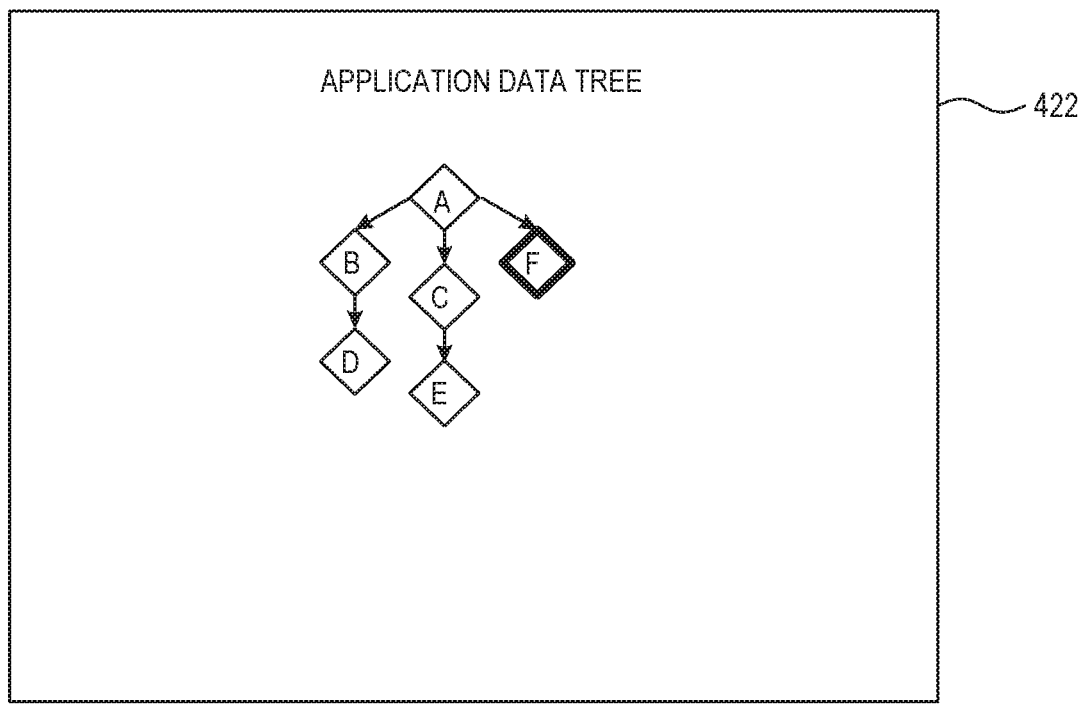
FIGS. 4A and 4B are diagrams showing operations of a version control system according to at least some of the disclosed embodiments.

The version control user interface 202 provides user interfaces in support of version control functionality of the disclosed embodiments. For example, the version control user interface 202 may include user interfaces to check in items, check out items, merge items, branch items, or generate difference reports between items. Specifically, the version control user interface 202 presents application data to a user that is structured in a tree graph 422 (FIG. 4A). The application data may include various code segments of a gaming application or other third-party application. Each node in the tree graph 422 of the application data defines a particular attribute of the application. For example, a given node in the application tree graph 422 may represent a scene of the game. The given node (A) may be connected to a subtree that defines attributes of the scene of the game. For example, a first level of the subtree may include two nodes, a first node (F) that defines characters in the scene and a second node (C) that defines action segments of the scene. The first node (F) may further branch down into additional nodes (not shown) that define properties of the characters in the scene. The second node (C) may further branch down into additional nodes (E) that define properties of the action segments of the scene. Each node may include state information for the application data corresponding to the node. Specifically, the state information may include application code and/or values that define the properties of the node attributes.

A user may interact with the version control user interface 202 to select a particular node (e.g., node F) of the application data tree graph 422 to modify. For example, the user can select the node (B) that defines the characters in the scene. In response, the user can input a request to modify the state information of the node (B) which generates a checkpoint for the node and adds the checkpoint to a checkpoint tree graph. In some implementations, another user request to modify the same node (B) may have previously been received. In such cases, a new checkpoint may be added to the checkpoint tree graph (shown in FIG. 4B) associated with and connected to the node (B) of the application data tree graph 422. Each checkpoint in the checkpoint tree graph includes a copy of the state information for the selected node.

Figure 4B:
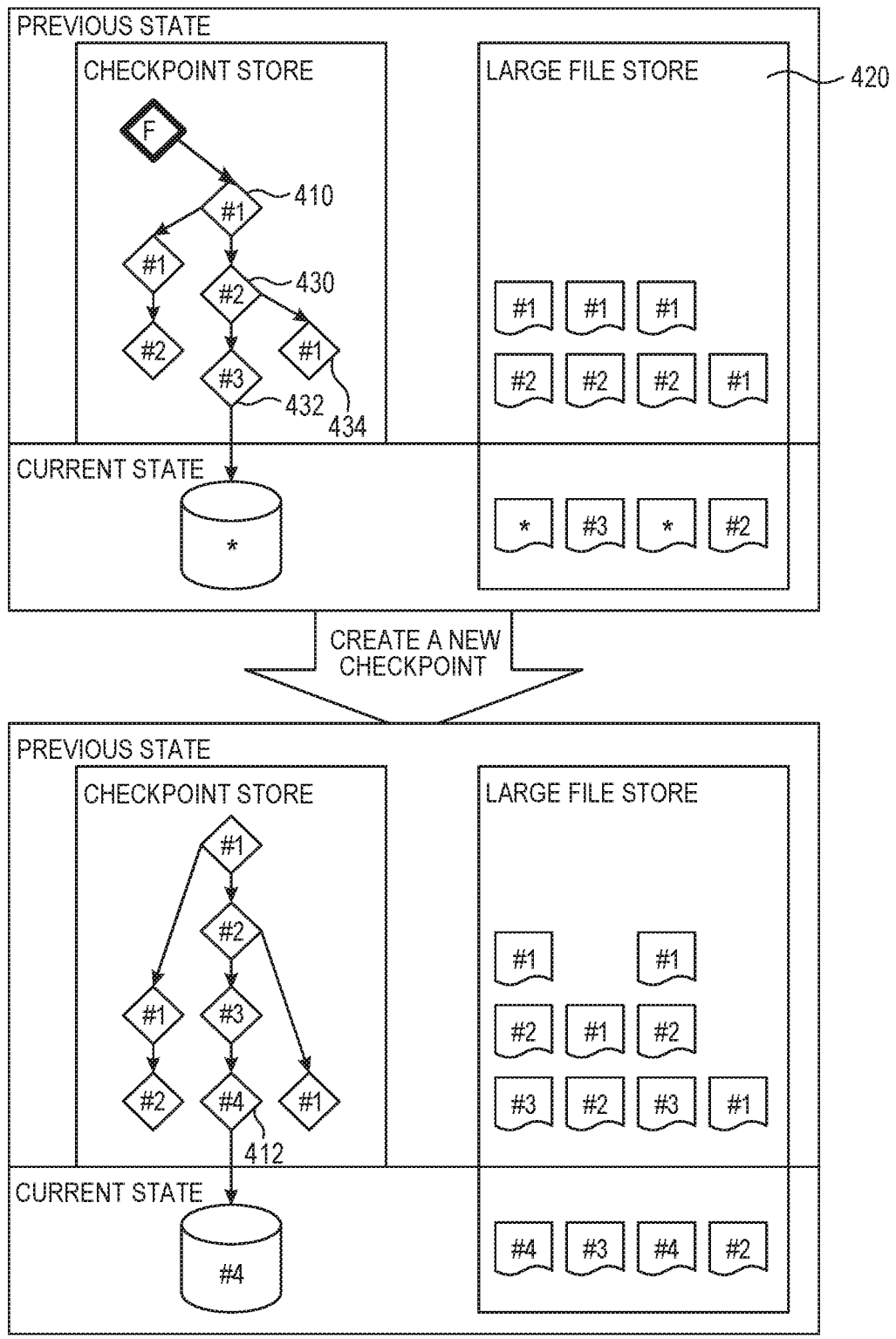

The branching module 204 may implement branching functionality of the version control system to manage checkpoints in the checkpoint tree graph shown in FIG. 4B. For example, the branching module 204 may generate one or more copies of particular items or documents to begin a new branch (or checkpoint) based on the copies in the checkpoint tree graph. As an example, in response to receiving the user request to modify or create a new branch or modify an existing node (F) of the application tree graph 422, the branching module 204 may create a checkpoint tree graph by creating a checkpoint node that includes a copy of the state information from the selected node (F) and/or referencing a previous copy of the state information. In particular, when a first user request to modify a particular node (F) of the application data tree graph 422 is received, the branching module 204 creates a permanent copy of the state information that is in the particular node (F) and stores that information in a first storage location as first checkpoint state information. The first storage location may also store an identifier of the selected particular node. The branching module 240 creates a first checkpoint node 410 in the checkpoint tree graph (#1) and connects the particular node of the application tree graph 422 to the first checkpoint node 410. Subsequent requests to modify the particular node (F) may cause the branching module 240 to add additional checkpoint nodes to the checkpoint tree graph and connect those additional checkpoint nodes to the first checkpoint node 410.

For example, at a later time, the branching module 204 may receive a second request from the same or another user to modify the same particular node (F) of the tree. The branching module 204 may determine existence of a change in the initial state information of the selected node (F) when the second request is received. For example, the branching module 204 may determine whether there are differences between the state information stored in the selected node (F) of the tree graph 422 and the state information stored in the first storage location for the first checkpoint node 410 of the checkpoint tree graph. In response to determining that the change exists, the branching module 204 stores the initial state information from the selected node (F) in a second storage location as the second checkpoint state information and creates a second checkpoint node 430. In response to determining that the change does not exist, the branching module 204 stores a reference to the first storage location as the second checkpoint state information instead of storing the initial state information in the second storage location.

The version control user interface 202 may present, to multiple users modifying or accessing the same node (F) of the application data tree graph 422, changes made to the state information of the node (F) in real time as the users modify the state information. Namely, as the version control user interface 202 detects changes being made to the state information of the node (F), the version control user interface 202 presents such changes to each of the users in a particular color or format to inform the users about changes being made by other users. After a given user completes making changes to the state information stored in the checkpoint node created for the user, the user inputs a command to the version control user interface 202 to check-in the changes. In response, the merging module 206 may update the state information in the particular node (F) of the application data tree graph 422 selected by the user based on any changes made to the state information in the checkpoint node of the checkpoint tree graph created for the user.

In some embodiments, the merging module 206 may integrate two copies of an item or checkpoint into a single copy. Conflicts between the two copies may be resolved via the display of a user interface provided by the version control user interface 202. The merging module 206 implements merging capabilities of the version control system. For example, the merging module may receive three items, a root item (root node) of the application data tree graph node or a root node in the checkpoint tree graph, and two branch items-checkpoint nodes that are children of the root node. The merging module 206 may determine differences between the root item and a first checkpoint node of the two branch items, and second differences between the root item and the second checkpoint node of the two branch items. The merging module 206 may then integrate the first and second differences into the root item to produce a merged version of the first and second branch items (checkpoint nodes). The merging module 206 may also identify conflicts between the first and second branch items (checkpoint nodes). In some aspects, a user interface may be displayed by the version control user interface 202 to resolve the identified conflicts.

In some embodiments, the merging module 206 may merge two checkpoint nodes of the checkpoint tree graph into the same node of the application data tree graph. For example, the merging module 206 may identify a node (F) of the application data tree graph for which a first set of checkpoints were created. The merging module 206 may determine whether additional checkpoints were created based on the first set of checkpoints. If no additional checkpoints were created, the merging module 206 may determine that the first set of checkpoints represents leaves of the tree graph of checkpoints. The merging module 206 may determine that the first and second checkpoint state information in first and second checkpoints of the first set of checkpoints were modified. The merging module 206 may compute a first difference for a given attribute in the modified first checkpoint state information and the given attribute in the initial state information of the application data tree graph node (F). The merging module 206 may determine whether the given attribute has also been modified in the second checkpoint state information. The merging module 206 may replace the given attribute in the initial state information for the application data tree graph node (F) with the data for the given attribute in the modified first checkpoint state information of the first checkpoint node in response to determining that the given attribute has not been modified in the second checkpoint state information of a second checkpoint node. The merging module 206 presents a conflict resolution prompt to a user identifying a conflict in response to determining that the given attribute has been modified in the second checkpoint state information of the second checkpoint node.

As an example, two users may select to modify a character in a scene. The two users may do so by selecting a node (F) in the application data tree graph corresponding to the character. In response, first and second checkpoint nodes that include or reference the state information for the character may be created for the two users and added to a checkpoint tree graph connected to the selected node (F). A first of the users may modify appearance attributes of the character while a second of the users may modify action properties of the character. When the users request to check-in their changes, the merging module 206 may determine that the checkpoint state information for the first user has modified a given attribute (e.g., the appearance attributes) of the character and that the second user has modified action properties of the character. As such, the merging module 206 may determine that the given attribute of the character modified in the state information for the checkpoint for the first user has not been modified in the state information for the second user. In such circumstances, the merging module 206 may replace the given attribute (e.g., the appearance attributes) of the character in the selected node (F) of the application data with the modified state information of the checkpoint state information for the first user. The merging module 206 may similarly replace the given attribute (e.g., the action properties) of the character in the selected node (F) of the application with the modified state information of the checkpoint state information for the second user. In some cases, the second user may also modify the appearance attributes and the merging module 206 may determine that the given attribute has been modified in both the first and the second checkpoint state information. In response, the merging module 206 presents a conflict message to the first and/or second user identifying the given attribute that has been modified by the checkpoint state information for both users.

The storage module 208 implements a storage solution for the data of the version control system. The storage solution may include implementation of storage within a structured data store, such as a relational database, or in an unstructured data store.

Figure 3:
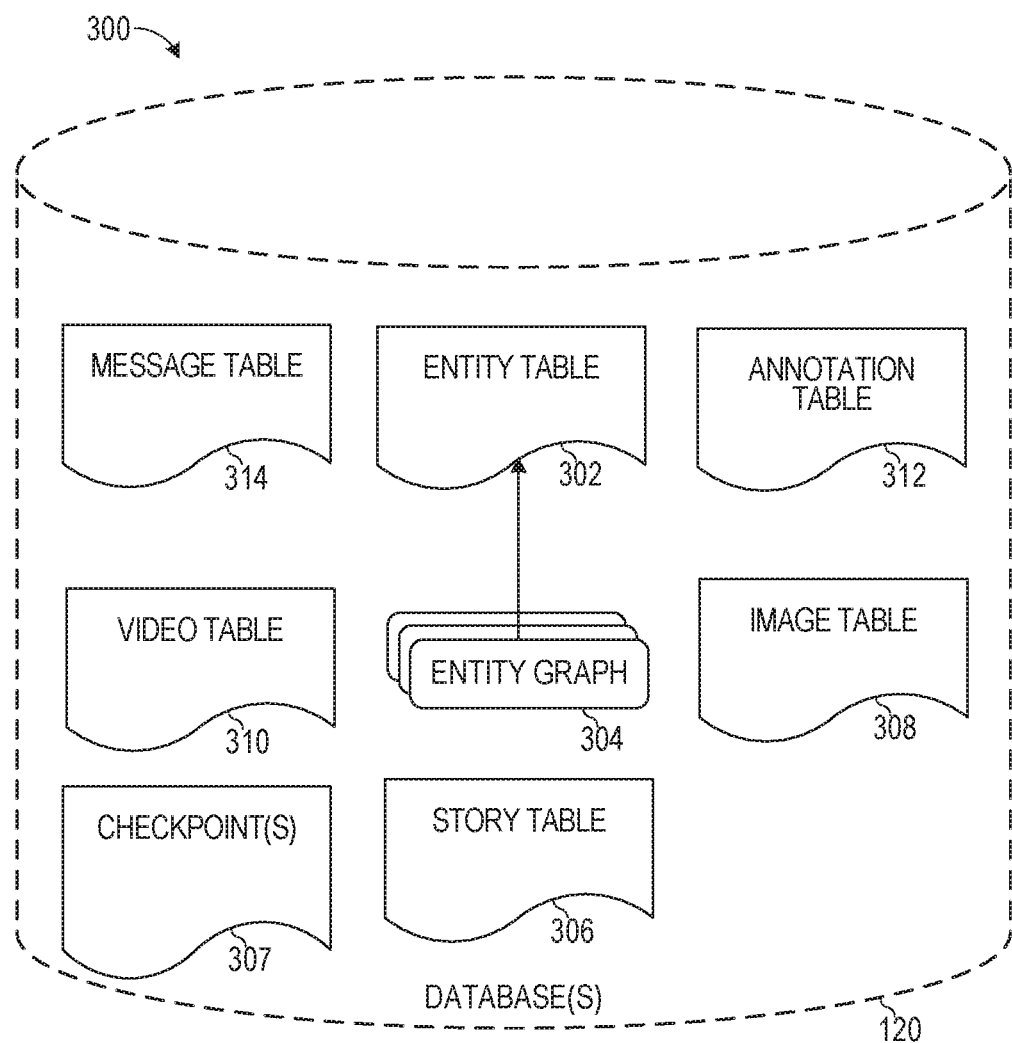
FIG. 3 is a schematic diagram illustrating data which may be stored in a database of the messaging system, according to some embodiments.

FIG. 3 is a schematic diagram 300 illustrating data which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 may include a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a Story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

Checkpoint(s) 307 stores one or more checkpoints and their relationships in a checkpoint tree graph. Specifically, as users request to modify one or more nodes of a tree graph of application data, checkpoints that identify the node of the application tree graph and that include copies of or references to state information in the one or more nodes are stored in checkpoint(s) 307. Each checkpoint node stored in the checkpoint(s) 307 may identify the application data tree graph node to which the checkpoint node corresponds. Each checkpoint node also may reference children checkpoint nodes that are connected to the checkpoint node in a checkpoint node tree graph.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

FIG. 4A shows an application data tree graph 422 with edges corresponding to parent-child relationships between application data nodes. FIG. 4B shows a checkpoint node tree graph with edges corresponding to parent-child relationships between checkpoint nodes. As new checkpoints are generated, they are referenced to either the node (e.g., node F) of the application data for which they are created and/or a previous checkpoint node. For example, a first user may select to modify a given node (F) of a tree graph of application data. In response, a first checkpoint node 410 may be created and added to the checkpoint node tree graph. The first checkpoint node 410 may be linked to the given node (F) of the application data tree graph as a child node of the given node (F). Later, a second user may request to modify the same given node (F). In response, the version control system may determine that a checkpoint (e.g., first checkpoint node 410) for that given node (F) already exists and may create a second checkpoint node 430 as a child of the first checkpoint node 410. The second checkpoint node 430 may duplicate the modified contents of the state information that is stored in the first checkpoint node 410. If the first checkpoint node 410 does not include modified state information, then the version control system may create a second checkpoint node as a child of the given node (F) of the application data tree graph and the second checkpoint node may be at the same level as the first checkpoint node 410 (rather than being a child of the first checkpoint node 410) and may include the same state information as the first checkpoint node 410. The checkpoint tree graph shown in FIG. 4B is used for ordered listing of the checkpoint nodes corresponding to one particular node of an application data tree graph and for finding the common ancestor of any two checkpoints being merged using a 3-way merge algorithm.

Specifically, the version control system may merge two checkpoints that are children of the same parent node (e.g., the same application data tree graph node (F) or the same checkpoint node). For example, checkpoint nodes 432 and 434 are children of the same parent checkpoint node 430. Namely, the version control system may merge any two checkpoint nodes that are on the same level of a checkpoint tree graph. Before merging the two checkpoint nodes, any children checkpoints of the two checkpoints need to be merged first. To do so, the version control system recursively traverses the checkpoint tree graph to identify a first set of checkpoints that are children of the first of the two checkpoint nodes. The version control system may traverse the checkpoint tree graph until a child checkpoint node is identified that does not itself have any further children checkpoints. As an example, the version control system starts with the first checkpoint node 410 and determines the first checkpoint node 410 has children and is not a leaf. As such, the version control system traverses the children of the first checkpoint node 410 and finds that the checkpoint nodes 432 and 434 are leaves in that they do not have any children checkpoint nodes connected to them. In this case, the version control system merges the changes from the checkpoint nodes 432 and 434 into their common parent checkpoint node 430. Then, checkpoint node 430 and another checkpoint node connected to the first checkpoint node 410 may be determined to be leaves. In response, the version control system merges the merged changes of checkpoint node 430 and the changes of another checkpoint node that is a leaf connected to the first checkpoint node 410 into the first checkpoint node 410.

In particular, the child checkpoint node is merged up to its parent checkpoint node. In some implementations, the parent checkpoint node has another child checkpoint node, in which case the merging system is used to combine the changes of the two child checkpoint nodes. Once all of the child checkpoint nodes of the checkpoint tree graph are processed and merged up to the first checkpoint node, the version control system may perform a similar process for other checkpoint nodes of the checkpoint tree graph. Once a single level of checkpoints that do not have further checkpoint children nodes is left, the version control system performs a merging process to merge the single level of checkpoints in the checkpoint tree graph into the parent node (F) of the application data tree graph.

Items in the current state database and checkpoints of a branch may be indexed, and thus retrievable, via branch identifier. Users may work on a branch. Edits made to a branch are saved in a current state database. Users working on the same branch may see the same (current) state in a user interface. Changes may become visible to all users of the branch in real time.

In some embodiments, generating a checkpoint node may entail saving an entire current state of a node to which the checkpoint pertains (e.g., a parent node of the checkpoint tree graph and/or a node of the application data tree graph 422) and producing a copy. A node in a checkpoint tree graph can be reverted to the state of any previous checkpoint node by overwriting a current state in the database with one saved in the previous checkpoint node. If a new checkpoint node is created after such an operation, the new checkpoint node may become a child of the latest checkpoint of the branch.

During a merge, each branch item is viewed as a graph, whose nodes are scalar values, dictionaries, or arrays. A merge produces a partial checkpoint object consisting of the portions of the item graphs that it was able to merge automatically. The merge also produces a set of conflicts to be manually resolved by a user, with paths that allow their later insertion into the partial merge result. After all conflicts have been resolved, the merge result checkpoint object is complete and can be used as the current state of the merge destination branch.

For example, a first checkpoint node 410 may be generated in response to receiving a user request to modify a given node (F) in an application tree graph 422. The version control system may copy the state information that is included in the given node (F) into a storage 420 associated with the first checkpoint node 410. At a later time, the version control system may receive a request from a second user to modify the given node (F) in the application tree graph 422. The version control system may determine that the state information in the first checkpoint node 410 has been modified. As a result, the version control system may generate a second checkpoint node 430 as a child of the first checkpoint node 410. The second checkpoint may copy over the modified state information from the first checkpoint node 410.

At a later time, after the second checkpoint node 430 is generated, the version control system may receive a third request to modify the given node (F) of the application tree graph 422. The version control system may determine that the given node (F) has two checkpoint nodes associated with the given node (F) in the checkpoint node tree graph. In such circumstances, the version control system may identify the leaf or the last created checkpoint node that is a child of the given node (F). In this case, the version control system may determine that the second checkpoint node 430 is the leaf or last checkpoint created. The version control system may determine whether any changes have been made to the state information associated with the second checkpoint node 430 when the third request is received. If a change is detected, the version control system may create a third checkpoint node 432 that duplicates the state information from the second checkpoint node 430. The version control system may receive a fourth request to modify the given node (F) in the application tree. The version control system may determine that the third checkpoint node 432 is the last checkpoint child in the checkpoint tree graph for the given node (F). The version control system may determine that no changes have been made to the state information of the third checkpoint node 432. In response, the version control system may generate a fourth checkpoint node 434 that references the checkpoint state information of the third checkpoint node 432 and is connected to the same parent second checkpoint node 430. Both the third checkpoint node 432 and the fourth checkpoint node 434 include the same duplicate state information from the second checkpoint node 430.

The version control system may receive a fifth request to modify the given node (F) of the application tree graph. In response, the version control system may identify the last checkpoint node in the checkpoint node tree graph that has been created (e.g., third checkpoint node 432). Then, the version control system may generate a fifth checkpoint node 412 when changes are detected in the third checkpoint node 432 relative to the second checkpoint node 430 (the parent of the third checkpoint node 432). The fifth checkpoint node 412 is connected to the third checkpoint node 432 and becomes a child of the third checkpoint node 432. The state information that has been modified in the third checkpoint node 432 is duplicated and copied into the fifth checkpoint node 412.

The version control system may receive a request to check in or merge the fifth checkpoint node 412. The version control system may determine that the fifth checkpoint node 412 is the last leaf in the tree graph or child of the first checkpoint node 410. The version control system may identify fourth checkpoint node 434 as another leaf in the tree of the first checkpoint node 410. As such, the version control system may create a checkpoint node that merges the changes to the state information associated with the fifth checkpoint node 412 and the fourth checkpoint node 434. In some cases, the changes are merged when no overlap is detected in the attributes that have been modified in the two checkpoints. If the same attributes have been modified in both checkpoints, the version control system may notify the user to resolve the conflict. After the changes are merged in the new checkpoint node, the version control system replaces the state information in their parent checkpoint node (e.g., the second checkpoint node 430) with the state information in the merged new checkpoint node.

The disclosed version control embodiments are designed for (e.g., web) applications using a database backend. For example, items under version control reside in a database. The disclosed version control embodiments treat each item as a graph. Merge conflicts may be found by recursively traversing tree graphs representing items from the source, destination, and common ancestor checkpoints. Each conflict may have a path from the root node of the item to the node at which the conflict occurs.

Treating version control items as graphs is natural with database-centered applications, because documents in a database usually have a 1-or-more level deep graph/tree structure, especially with No-SQL databases. Items for different branches can be in the database at the same time and distinguishable by branch identifier. Large objects are represented in the database and the checkpoints by references to their permanent external storage locations. New copies are only created when changes are made to such objects; for example, the same reference can be stored in multiple checkpoints and even branches.

FIG. 5 is a flowchart of a process 500 that may be performed in one or more of the disclosed embodiments. The process 500 may be embodied in computer-readable instructions for execution by one or more processors such that the operations of the process 500 may be performed in part or in whole by the functional components of the messaging server system 108; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

In operation 501, the messaging server system 108 stores, in a database, application data that is structured as a tree graph comprising nodes in the form of branches connected by respective edges, with each child branch being connected to a single corresponding parent branch by a respective edge.

In operation 502, the messaging server system 108 generates a first checkpoint that identifies a node of the tree graph, the first checkpoint comprising first checkpoint state information corresponding to initial state information of the node of the tree graph.

In operation 503, the messaging server system 108 generates a second checkpoint that identifies the node of the tree graph, with the second checkpoint comprising second checkpoint state information corresponding to the initial state information of the node of the tree graph.

In operation 504, the messaging server system 108 merges changes made to the first and second checkpoint state information.

In operation 505, the messaging server system 108 modifying the initial state information of the node of the tree graph based on the merged changes.

Software Architecture

Figure 6:
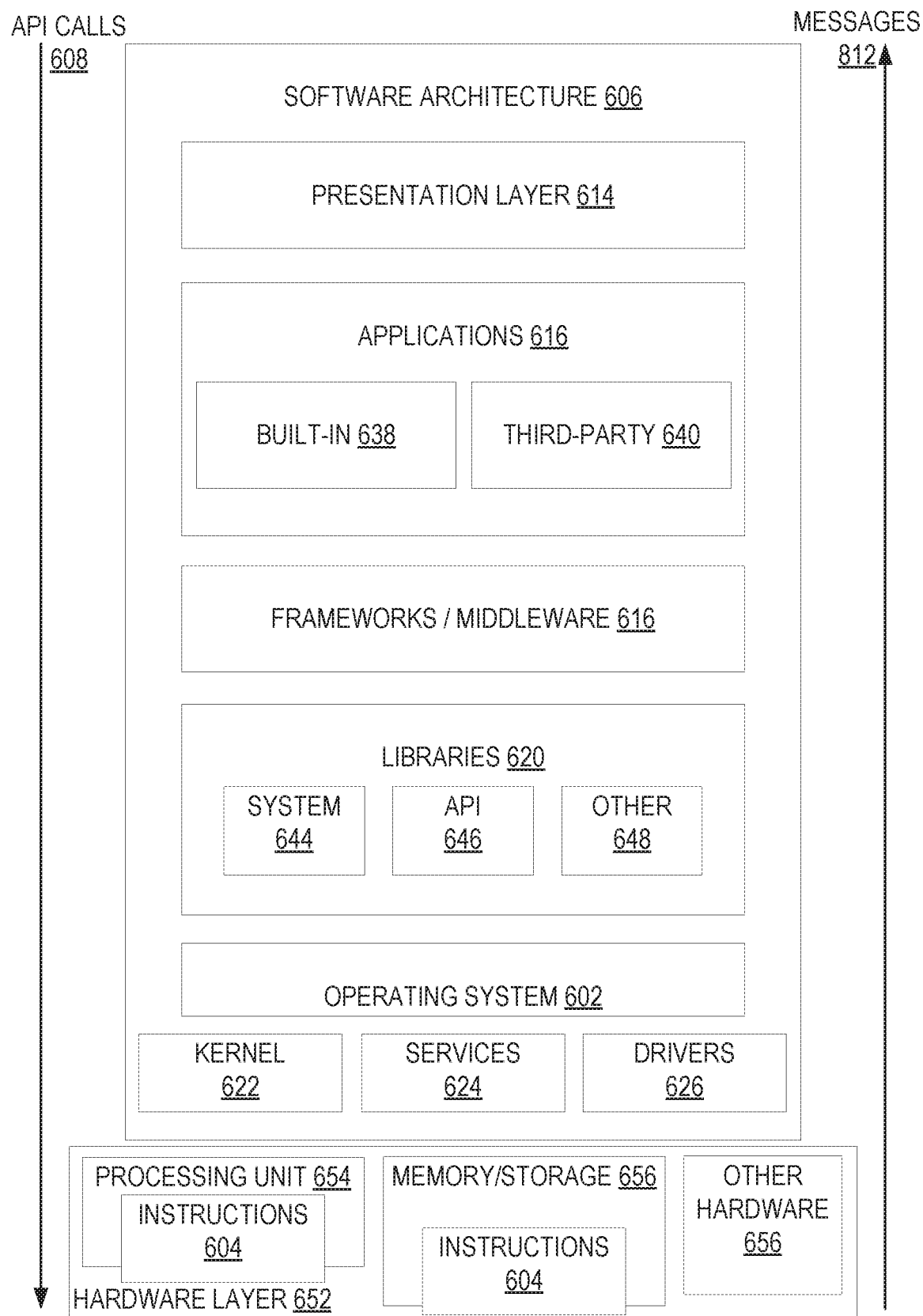
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as a machine 700 of FIG. 7 that includes, among other things, processors 704, memory/storage 706, and I/O components 718. A representative hardware layer 652 is illustrated and can represent, for example, the machine 700 of FIG. 7. The representative hardware layer 652 includes a processing unit 654 having associated executable instructions 604. The executable instructions 604 represent the executable instructions of the software architecture 606, including implementation of the methods, components, and so forth described herein. The hardware layer 652 also includes memory and/or storage 656, which also have the executable instructions 604. The hardware layer 652 may also comprise other hardware 658.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, frameworks/middleware, applications 616, and a presentation layer 614. Operationally, the applications 616 and/or other components within the layers may invoke API calls 608 through the software stack and receive a response as messages 812. The layers illustrated are representative in nature and not all software architectures have all layers. For example, some mobile or special-purpose operating systems may not provide a frameworks/middleware 618 layer, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than by interfacing directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. The third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as the operating system 602) to facilitate functionality described herein.

The applications 616 may use built-in operating system functions (e.g., kernel 622, services 624, and/or drivers 626), libraries 620, and frameworks/middleware 618 to create user interfaces to interact with users of the system. Alternatively, or additionally, in some systems interactions with a user may occur through a presentation layer, such as the presentation layer 614. In these systems, the application/component "logic" can be separated from the aspects of the application/component that interact with a user.

Exemplary Machine

Figure 7:
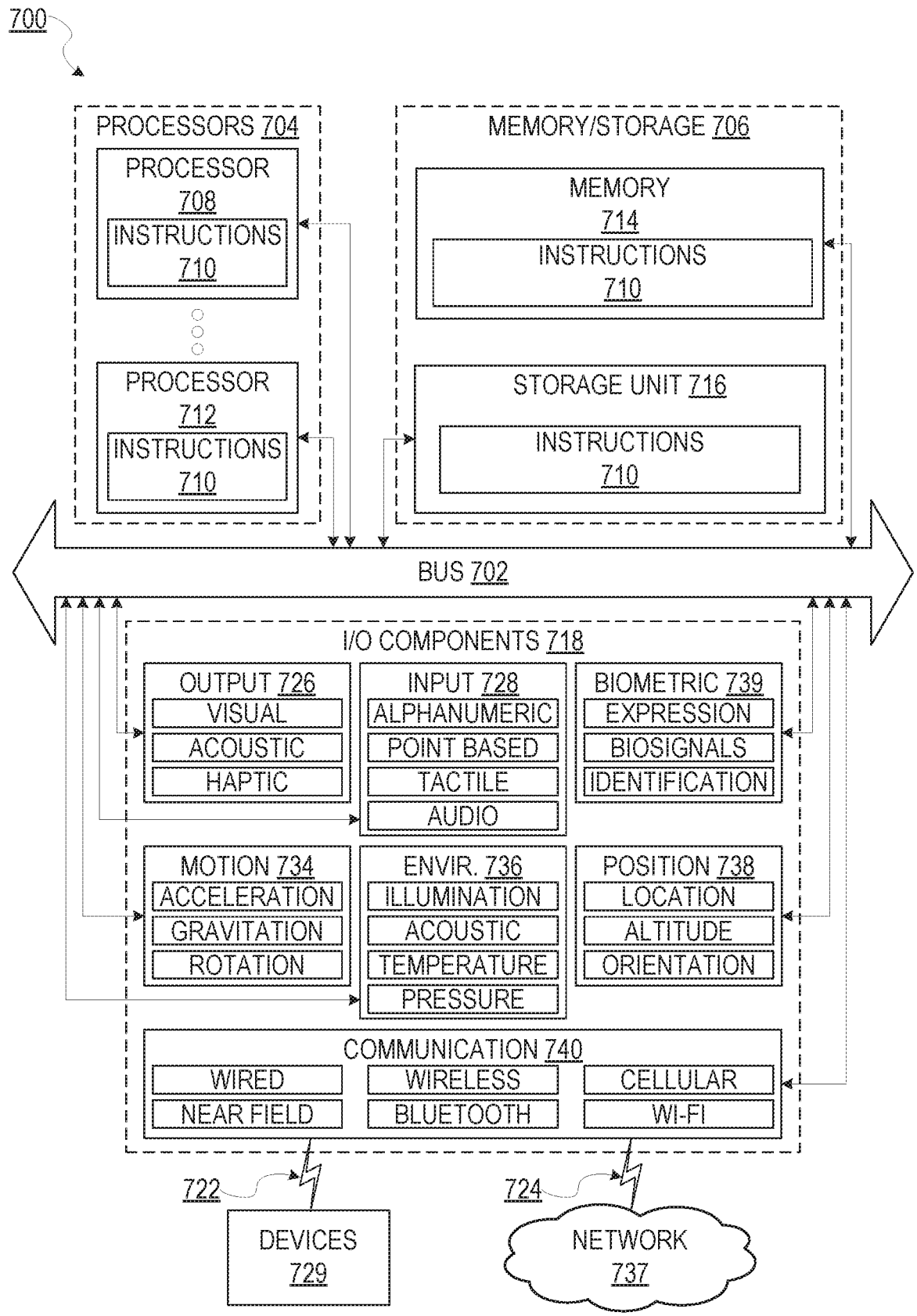
FIG. 7 is a block diagram illustrating components of a machine, according to some exemplary embodiments, able to read instructions from a machine-readable medium (e.g., a machine-readable storage medium) and perform any one or more of the methodologies discussed herein.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of the processors 704 are examples of machine-readable media.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 728 may also include one or more image-capturing devices, such as a digital camera for generating digital images and/or video.

In further exemplary embodiments, the I/O components 718 may include biometric components 739, motion components 734, environment components 736, or position components 738, as well as a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 737 or devices 729 via a coupling 724 and a coupling 722, respectively. For example, the communication components 740 may include a network interface component or other suitable device to interface with the network 732. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

We claim:

1. A method comprising:
   storing, in a database by one or more processors, application data comprising a scene of a gaming application, the application data being structured as an application data tree graph comprising nodes and branches connected by respective edges and wherein each of the nodes of the application data tree graph represents a different game entity;
   generating a separate checkpoint tree graph distinct from the application data tree graph, the checkpoint tree graph comprising checkpoint nodes storing version control information for corresponding nodes of the application data tree graph;
   receiving a first request to modify a first application data node of the nodes of the application data tree graph, the first application data node of the nodes of the application data tree graph representing a player character, wherein the first application data node is connected to a subtree of application data nodes representing properties of the player character and wherein a subtree of a first of the properties of the player character comprises a collection of simpler properties of the first property;

in response to the receiving the first request to modify the first application data node, copying initial state information from the first application data node into a first storage location of the checkpoint tree graph;

generating, based on the first storage location of the checkpoint tree graph, a first checkpoint that identifies the first application data node of the application data tree graph, the first checkpoint comprising first checkpoint state information corresponding to the initial state information of the first application data node of the application data tree graph;

determining that a first child node and a second child node are connected to a same parent node associated with the first checkpoint and are on a same level of the application data tree graph;

in response to determining that the first child node and the second child node are connected to the same parent node and are on the same level of the application data tree graph and in response to determining that the first child node and the second child node are leaves and do not have any children checkpoint nodes, modifying contents of the same parent node by integrating differences between the first child node and the second child node in the same parent node;

after receiving the first request to modify the first application data node, receiving a second request to modify the same first application data node of the nodes of the application data tree graph as the first request;

in response to the receiving the second request to modify the first application data node after receiving the first request to modify the first application data node, copying the initial state information from the first application data node into a second storage location of the checkpoint tree graph; and in response to the receiving the second request to modify the first application data node after receiving the first request to modify the first application data node, generating, based on the second storage location of the checkpoint tree graph, a second checkpoint that identifies the first application data node of the application data tree graph, the second checkpoint comprising second checkpoint state information corresponding to the initial state information of the first application data node of the application data tree graph, wherein the second request causes a same set of the initial state information to be stored concurrently by the first checkpoint state information and the second checkpoint state information;

wherein a second of the nodes of the application data tree graph represents action segments of the scene, wherein the second node is connected to a subtree of nodes representing properties of the action segments of the scene; and wherein a subtree of a first of the properties of the action segments of the scene comprise a collection of simpler properties of the first property of the action segments of the scene.

2. The method of claim 1, further comprising:
presenting the application data tree graph in a graphical user interface of a client device of a first user.

3. The method of claim 2, further comprising receiving second input from a second user that selects the first application data node of the application data tree graph to modify, wherein the second checkpoint is generated in response to the receiving the second input.

4. The method of claim 3, further comprising presenting changes made to the first and second checkpoint state information to multiple users in real time as the changes are being made.

5. The method of claim 1, further comprising determining existence of a change in the initial state information at a time of generating the second checkpoint since the first checkpoint was generated.

6. The method of claim 5, further comprising:
in response to determining that the change exists, storing the initial state information in the second storage location as the second checkpoint state information.

7. The method of claim 6, further comprising:
in response to determining that the change does not exist, storing a reference to the first storage location as the second checkpoint state information instead of storing the initial state information in the second storage location.

8. The method of claim 1, further comprising:
modifying the first and second checkpoint state information and merging the modifications made to the first and second checkpoint state information comprising:
computing a first difference for a given attribute in the modified first checkpoint state information and the given attribute in the initial state information of the first application data node;
determining whether the given attribute has been modified in the second checkpoint state information; and
replacing the given attribute in the initial state information with the data for the given attribute in the modified first checkpoint state information in response to determining that the given attribute has not been modified in the second checkpoint state information.

9. The method of claim 8, further comprising:
presenting a conflict resolution prompt to a user identifying a conflict in response to determining that the given attribute has been modified in the second checkpoint state information.

10. The method of claim 9, further comprising:
receiving user input resolving the conflict; and
updating a given value in the initial state information based on the received user input.

11. The method of claim 1, wherein the initial state information of the first application data node of the application data tree graph is modified by recursively traversing changes made to checkpoints that identify the first application data node of the application data tree graph, further comprising:
determining that a single level of checkpoints in the checkpoint tree graph that do not have further checkpoint children nodes are left; and
in response to determining that the single level of checkpoints in the checkpoint tree graph that do not have further checkpoint children nodes are left, merging the single level of checkpoints in the checkpoint tree graph into the first application data node of the application data tree graph.

12. The method of claim 1, further comprising:
connecting the first and second checkpoints to the first application data node in the application data tree graph; and
determining that the first checkpoint includes a plurality of children checkpoint nodes comprising the first and second child nodes.

13. The method of claim 12, wherein the second checkpoint is generated by copying the first checkpoint state information of the first checkpoint; and wherein the second checkpoint becomes a child node of the first checkpoint in the checkpoint tree graph and is connected to the first application data node of the application data tree graph via the first checkpoint.

14. A system comprising:
one or more processors configured to perform operations comprising:
storing, in a database, application data comprising a scene of a gaming application, the application data being structured as an application data tree graph comprising nodes and branches connected by respective edges wherein each of the nodes of the application data tree graph represents a different game entity;
generating a separate checkpoint tree graph distinct from the application data tree graph, wherein the checkpoint tree graph comprises checkpoint nodes storing version control information for corresponding nodes of the application data tree graph;
receiving a first request to modify a first application data node of the nodes of the application data tree graph, the first application data node of the nodes of the application data tree graph representing a player character, wherein the first application data node is connected to a subtree of nodes representing properties of the player character and wherein a subtree of a first of the properties of the player character comprises a collection of simpler properties of the first property;
in response to the receiving the first request to modify the first application data node, copying initial state information from the first application data node into a first storage location of a checkpoint tree graph;
generating, based on the first storage location of the checkpoint tree graph, a first checkpoint that identifies the first application data node of the application data tree graph, the first checkpoint comprising first checkpoint state information corresponding to the initial state information of the first application data node of the application data tree graph;
determining that a first child node and a second child node are connected to a same parent node associated with the first checkpoint and are on a same level of the application data tree graph;
in response to determining that the first child node and the second child node are connected to the same parent node and are on the same level of the application data tree graph and in response to determining that the first child node and the second child node are leaves and do not have any children checkpoint nodes, modifying contents of the same parent node by integrating differences between the first child node and the second child node in the same parent node;
after receiving the first request to modify the first application data node, receiving a second request to modify the first application data node of the nodes of the application data tree graph as the first request;
in response to the receiving the second request to modify the first application data node after receiving the first request to modify the first application data node, copying the initial state information from the first application data node into a second storage location of the checkpoint tree graph; and
in response to the receiving the second request to modify the first application data node after receiving the first request to modify the first application data node, generating, based on the second storage location of the checkpoint tree graph, a second checkpoint that identifies the first application data node of the application data tree graph, the second checkpoint comprising second checkpoint state information corresponding to the initial state information of the first application data node of the application data tree graph, wherein the second request causes a same set of the initial state information to be stored concurrently by the first checkpoint state information and the second checkpoint state information;
wherein a second application data node of the nodes of the application data tree graph represents action segments of the scene, wherein the second application data node is connected to a subtree of nodes representing properties of the action segments of the scene; and wherein a subtree of a first of the properties of the action segments of the scene comprise a collection of simpler properties of the first property of the action segments of the scene.

15. The system of claim 14, wherein the operations further comprise:
receiving first input from a first user that selects the first application data node of the application data tree graph to modify, wherein the first checkpoint is generated in response to the receiving the first input.

16. The system of claim 15, wherein the operations further comprise:
receiving second input from a second user that selects the first application data node of the application data tree graph to modify, wherein the second checkpoint is generated in response to the receiving the second input.

17. The method of claim 12, further comprising:
determining first differences between the same parent node and the first child node;
determining second differences between the same parent node and the second child node; and
integrating the first differences and the second differences into the same parent node to produce a merged version of the first and second child nodes.

18. A non-transitory computer-readable medium comprising computer-readable instructions that, when executed by one or more processors, configure the one or more processors to perform operations comprising:
storing, in a database, application data comprising a scene of a gaming application, the application data being structured as an application data tree graph comprising nodes and branches connected by respective edges wherein each of the nodes of the application data tree graph represents a different game entity;
generating a separate checkpoint tree graph distinct from the application data tree graph, wherein the checkpoint tree graph comprises checkpoint nodes storing version control information for corresponding nodes of the application data tree graph;
receiving a first request to modify a first application data node of the nodes of the application data tree graph, the first application data node of the nodes of the application data tree graph representing a player character, wherein the first application data node is connected to a subtree of nodes representing properties of the player character and wherein a subtree of a first of the properties of the player character comprises a collection of simpler properties of the first property;
in response to the receiving the first request to modify the first application data node, copying initial state information from the first application data node into a first storage location of the checkpoint tree graph;
generating, based on the first storage location of the checkpoint tree graph, a first checkpoint that identifies the first application data node of the application data tree graph, the first checkpoint comprising first checkpoint state information corresponding to the initial state information of the first application data node of the application data tree graph;

determining that a first child node and a second child node are connected to a same parent node associated with the first checkpoint and are on a same level of the application data tree graph;

in response to determining that the first child node and the second child node are connected to the same parent node and are on the same level of the application data tree graph and in response to determining that the first child node and the second child node are leaves and do not have any children checkpoint nodes, modifying contents of the same parent node by integrating differences between the first child node and the second child node in the same parent node;

after receiving the first request to modify the same first application data node, receiving a second request to modify the first application data node of the application data tree graph as the first request;

in response to the receiving the second request to modify the first application data node after receiving the first request to modify the first application data node, copying the initial state information from the first application data node into a second storage location of the checkpoint tree graph; and in response to the receiving the second request to modify the first application data node after receiving the first request to modify the first application data node, generating, based on the second storage location of the checkpoint tree graph, a second checkpoint that identifies the first application data node of the application data tree graph, the second checkpoint comprising second checkpoint state information corresponding to the initial state information of the first application data node of the application data tree graph, wherein the second request causes a same set of the initial state information to be stored concurrently by the first checkpoint state information and the second checkpoint state information;

wherein a second application data node of the nodes of the application data tree graph represents action segments of the scene, wherein the second application data node is connected to a subtree of nodes representing properties of the action segments of the scene; and wherein a subtree of a first of the properties of the action segments of the scene comprise a collection of simpler properties of the first property of the action segments of the scene.

19. The non-transitory computer-readable medium of claim 18, wherein the operations further comprise:

receiving first input from a first user that selects the first application data node of the application data tree graph to modify, wherein the first checkpoint is generated in response to the receiving the first input.

\* \* \* \* \*